United States Patent
Lauster et al.

(10) Patent No.: US 11,706,612 B2
(45) Date of Patent: Jul. 18, 2023

(54) INTERCONNECTION FUNCTIONALITY BETWEEN A FIRST MOBILE COMMUNICATION NETWORK AND A SECOND MOBILE COMMUNICATION NETWORK

(71) Applicant: Deutsche Telekom AG, Bonn (DE)

(72) Inventors: Reinhard Lauster, St. Poelten (AT); Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 62 days.

(21) Appl. No.: 17/367,690

(22) Filed: Jul. 6, 2021

(65) Prior Publication Data
US 2022/0014904 A1   Jan. 13, 2022

(30) Foreign Application Priority Data
Jul. 9, 2020  (EP) .................................... 20185037

(51) Int. Cl.
*H04W 8/28*   (2009.01)
*H04W 84/04*  (2009.01)
(Continued)

(52) U.S. Cl.
CPC ............ *H04W 8/28* (2013.01); *H04L 61/256* (2013.01); *H04L 2101/654* (2022.05); *H04W 84/042* (2013.01)

(58) Field of Classification Search
None
See application file for complete search history.

(56) References Cited

U.S. PATENT DOCUMENTS

2009/0313356 A1 * 12/2009 Guttman ............. H04L 2101/30
                                                        709/220
2010/0195641 A1 *  8/2010 Tsai .................... H04M 7/0075
                                                        370/352
(Continued)

FOREIGN PATENT DOCUMENTS

WO   WO-2017182057 A1 * 10/2017 ............ H04W 12/04
WO   WO-2021259499 A1 * 12/2021

OTHER PUBLICATIONS

Qualcomm Incorporated, et al., "TS 23.501: Introducing Non-public network", 3rd Generation Partnership Project (3GPP) TSG-SA Meeting #131, Feb. 25-Mar. 1, 2019, pp. 1-11, version 15.4.0, 3GPP, Santa Cruz-Tenerife, Spain, XP051611087.
(Continued)

*Primary Examiner* — Kenny S Lin
(74) *Attorney, Agent, or Firm* — Leydig, Voit & Mayer, Ltd.

(57) ABSTRACT

A method for an interconnection functionality between a first mobile communication network and a second mobile communication network includes: associating or assigning private identifier information to specific public land mobile network (PLMN) identifier information related to the second mobile communication network; and in respect of signalling messages and/or data traffic packets that are to be routed or to be addressed or to be processed, providing for or supporting, by a network identifier and number translating functionality, a replacement and/or a translation, in both directions, between the private identifier information and the specific PLMN identifier information related to the second mobile communication network.

11 Claims, 3 Drawing Sheets

(51) Int. Cl.
  *H04L 61/256* (2022.01)
  *H04L 101/654* (2022.01)

(56) References Cited

U.S. PATENT DOCUMENTS

2012/0163297 A1* 6/2012 Agarwal ............ H04L 12/1425
  370/328
2022/0174464 A1* 6/2022 Ohlsson ................ H04W 76/50
2022/0201592 A1* 6/2022 Lindheimer .......... H04W 48/18

OTHER PUBLICATIONS

Anonymous, "3$^{rd}$ Generation Partnership Project; Technical specification Group Services and System Aspects; Study on enhancement of 5GS for Vertical and LAN services (Release 16)", 3$^{rd}$ Generation Partnership Project (3GPP), Mar. 25, 2019, pp. 1-111, version 16.1.0, 3GPP, Sophia-Antipolis, France, XP051751813.

China Telecom, "On Private Network Support for NG-RAN", 3$^{rd}$ Generation Partnership Project (3GPP) TSG RAN WG3#105, Aug. 26-30, 2019, pp. 1-7, version R3-193832, 3GPP, Ljubljana, Slovenia, XP051770031.

Anonymous, 3$^{rd}$ Generation Partnership Project; Technical Specification Group Services and System Aspects; System Architecture for the 5G System (5GS); Stage 2 (Release 16); 3$^{rd}$ Generation Partnership Project (3GPP), Sep. 24, 2019, version 16.2.0, pp. 1-391, 3GPP, Sophia-Antipolis, France, XP051784669.

* cited by examiner

INTERCONNECTION FUNCTIONALITY BETWEEN A FIRST MOBILE COMMUNICATION NETWORK AND A SECOND MOBILE COMMUNICATION NETWORK

CROSS-REFERENCE TO PRIOR APPLICATIONS

Priority is claimed to European Patent Application No. EP 20 185 037.7, filed on Jul. 9, 2020, the entire disclosure of which is hereby incorporated by reference herein.

FIELD

The present invention relates a method for an improved interconnection functionality between a first mobile communication network on the one hand, and a second mobile communication network on the other hand, the first mobile communication network corresponding either to a public land mobile network or to a mobile communication network domain, wherein the second mobile communication network is a non-public network (NPN) or a standalone non-public network (SNPN) having or using a private identifier information and wherein the first mobile communication network has been assigned to or has or uses a globally unique public land mobile network (PLMN) identifier information.

Furthermore, the present invention relates to a system for an improved interconnection functionality between a first mobile communication network on the one hand, and a second mobile communication network on the other hand, the first mobile communication network corresponding either to a public land mobile network or to a mobile communication network domain,
wherein the second mobile communication network is a non-public network (NPN) or a standalone non-public network (SNPN) having or using a private identifier information and wherein the first mobile communication network has been assigned to or has or uses a globally unique PLMN identifier information.

Additionally, the present invention relates to a mobile communication network being a first mobile communication network for an improved interconnection functionality between a first mobile communication network on the one hand, and the second mobile communication network on the other hand, the first mobile communication network corresponding either to a public land mobile network or to a mobile communication network domain, wherein the second mobile communication network is a non-public network (NPN) or a standalone non-public network (SNPN) having or using a private identifier information and wherein the first mobile communication network has been assigned to or has or uses a globally unique PLMN identifier information.

Furthermore, the present invention relates to a network identifier and number translating functionality for an improved interconnection functionality between a first mobile communication network on the one hand, and a second mobile communication network on the other hand, the first mobile communication network corresponding either to a public land mobile network or to a mobile communication network domain,
wherein the second mobile communication network is a non-public network (NPN) or a standalone non-public network (SNPN) having or using a private identifier information and wherein the first mobile communication network has been assigned to or has or uses a globally unique PLMN identifier information.

Furthermore, the present invention relates to a program, and a computer program product for an improved interconnection functionality between a second mobile communication network on the one hand, and a first mobile communication network on the other hand.

BACKGROUND

Mobile communication networks according to the 5G ("fifth generation") standard are increasingly in operative use. According to this technology, the use of so-called non-public networks (NPN) or even standalone-non-public-networks (SNPN) is possible.

One typical application of such NPN networks or SNPN networks is likely to be the industrial environment, especially for indoor factories. There, the production and processing infrastructure is comparatively complex and therefore communications among massive internal devices together with real-time latency is often required. 5G is able to be the technical networking or communication basis to enable such use cases. According to the standardization, this is a possible solution. Therefore, special isolated Standalone-Non—Public-Networks (SNPNs) are defined in 3GPP.

However, it is a challenge to interconnect such different non-public networks or standalone non-public networks.

SUMMARY

In an exemplary embodiment, the present invention provides a method for an interconnection functionality between a first mobile communication network and a second mobile communication network. The first mobile communication network corresponds to a public land mobile network or to a mobile communication network domain. The second mobile communication network is a non-public network (NPN) or a standalone non-public network (SNPN) having or using private identifier information. The first mobile communication network has been assigned to or has or uses globally unique public land mobile network (PLMN) identifier information. The first mobile communication network comprises a network identifier and number translating functionality. The method includes: associating or assigning the private identifier information to specific PLMN identifier information related to the second mobile communication network; and in respect of signalling messages and/or data traffic packets that are to be routed or to be addressed or to be processed, providing for or supporting, by the network identifier and number translating functionality, a replacement and/or a translation, in both directions, between the private identifier information and the specific PLMN identifier information related to the second mobile communication network.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
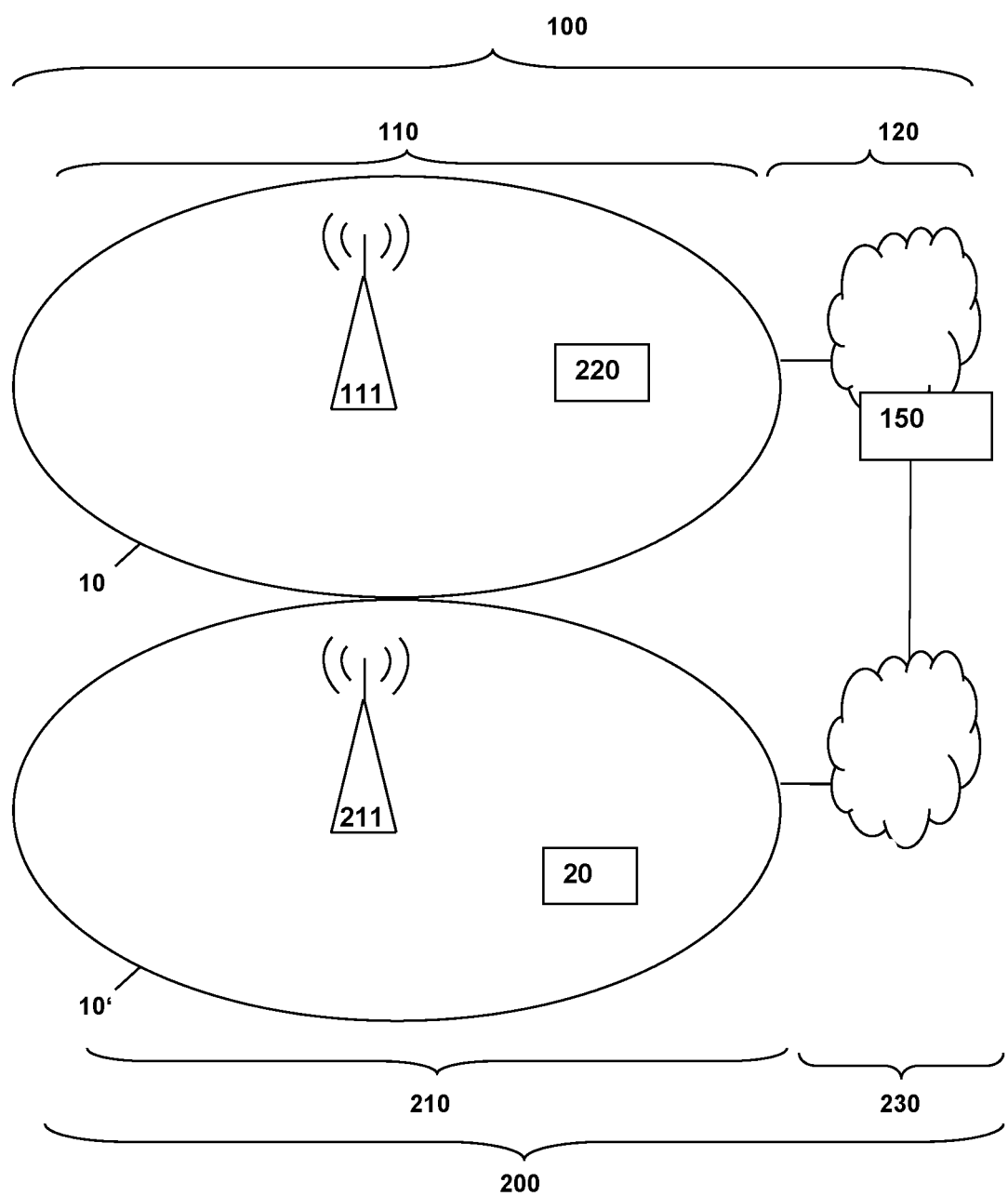
FIGS. 1 and 2 schematically illustrate a first and second mobile communication network, and a network identifier and number translating functionality according to the present invention.

Exemplary embodiments of the present invention provide a technically simple, effective and cost effective solution for an improved interconnection functionality between a first mobile communication network on the one hand, and a second mobile communication network on the other hand, especially in case that the second mobile communication network is a non-public network (NPN) or a standalone non-public network (SNPN) having or using a private identifier information. Exemplary embodiments of the present invention provide a corresponding system, a corresponding mobile communication network (especially a second mobile communication network), a corresponding network identifier and number translating functionality, and a corresponding program and computer program product.

In an exemplary embodiment, the present invention provides a method for an improved interconnection functionality between a first mobile communication network on the one hand, and a second mobile communication network on the other hand, the first mobile communication network corresponding either to a public land mobile network or to a mobile communication network domain,
wherein the second mobile communication network is a non-public network (NPN) or a standalone non-public network (SNPN) having or using a private identifier information and wherein the first mobile communication network has been assigned to or has or uses a globally unique PLMN identifier information,
wherein the first mobile communication network comprises a network identifier and number translating functionality, wherein the method comprises the following steps:
- in a first step, the private identifier information used within or by the second mobile communication network and/or by a user equipment of the second mobile communication network is associated or assigned to a specific PLMN identifier information related to the second mobile communication network,
- in a second step, subsequent to the first step, and in respect of signalling messages and/or data traffic packets that are to be routed or to be addressed or to be processed, the network identifier and number translating functionality provides for or supports a replacement and/or a translation, in both directions, between, on the one hand, the private identifier information related to the second mobile communication network, and, on the other hand, the specific PLMN identifier information related to the second mobile communication network.

Standalone non-public networks (SNPNs) or non-public networks were initially meant to operate isolated from public networks, i.e. PLMN networks. SNPNs are standardized to use different network selection procedures, which includes different network identifiers (i.e. different than PLMN-based), as well as non-IMSI identifiers for their subscribers. This creates difficulties in case of interworking with other mobile communication networks. According to the present invention, it is advantageously possible to provide a solution for such interconnection scenarios, e.g. in case that a third party (e.g. an IPX service) allows interoperability via numbering translation.

Hence, it is advantageously possible according to the present invention to provide a new functionality providing numbering and network identifier translation and mapping. This functionality maps non-PLMN-compliant numbering like private addresses and private network identifiers to PLMN-compliant identifiers so that they can be routed via existing infrastructure. Such interworking cases include:
- SNPN interconnection with a PLMN network, where the PLMN network only supports private PLMN numbering
- SNPN interconnection with a SNPN network via one or more IPX services, where the IPX service(s) internally use the current PLMN-based routing between public networks only.

Furthermore, it is advantageously possible according to the present invention that public identifiers or identifier information is able to be masked, especially in order to provide or ensure privacy.

PLMN-MCC=999 is defied in ITU E.212 Numbering for SNPNs as for internal use within a private networks and not intend to be public routable. Thus, PLMNs using MCC 999 are intended for private or standalone usage and their identifiers are not guaranteed to be globally unique, and, hence, usable for interconnection with other mobile communication networks.

Network selection for SNPNs is based on additional identifiers such as Network Identifier (NID), which is broadcast by the network of top of the SNPN's non-unique PLMN code (e.g. PLMN 999 99, NID 123). The combination of PLMN and NID is also self-managed and thus, also not guaranteed to be unique. This results in such signaling messages not being routable in a public network infrastructure.

In NPN, used IDs for subscribers might follow the E.212 and E.164 coding but might also be private and not routable in a public network infrastructure, i.e. SNPNs can use subscriber identifiers that are not IMSI-based and/or non-public IMSI (i.e. with a private PLMN-ID). Furthermore, legal interception (LI) systems are currently deployed for networks and systems compliant with public network numbering and deeply integrated with said used public addresses. They are not able to support other private numbering mechanisms According to the present invention, it is advantageously possible that signaling (i.e. signaling messages) of networks that are not uniquely identifiable by a (unique) PLMN code are able to be routed on public network infrastructure. Furthermore, service continuity between private SNPN subscribers is possible to ensure in case such subscribers are changing to a public land mobile network. Hence, via the present invention, it is advantageously possible to reuse public network infrastructure such that is its, e.g., possible to re-use well deployed charging systems and/or it is possible to provide for legal interception functionalities and/or to provide for a high level of privacy in case of inter-network connectivity using masking of used public identifiers.

According to the present invention, it is advantageously possible and preferred that within the second mobile communication network, subscriber identity information and/or subscriber credential information relating to the user equipment is used corresponding to private or non-public types of subscriber identity information and/or private or non-public types of subscriber credential information, wherein—in the first step—such private or non-public types of subscriber identity information and/or private or non-public types of subscriber credential information, used within or by the second mobile communication network relating to the user equipment, is associated or assigned to subscriber identity information and/or subscriber credential information matching the type of subscriber identity and/or subscriber credential information used within the first mobile communication network, especially corresponding to using the international mobile subscriber identity (IMSI) format as subscriber identity information and using the authentication and key agreement protocol for authentication purposes, and
wherein, in respect of signalling messages and/or data traffic packets are to be routed or to be addressed or to be processed, the network identifier and number translating functionality provides for or supports—in the second step—a replacement and/or a translation, in both directions, between, on the one hand, the private or non-public types of subscriber identity information and/or private or non-public types of subscriber credential information related to the second mobile communication network, and, on the other hand, the type of subscriber identity and/or subscriber credential information used within the first mobile communication network, especially corresponding to using the international mobile subscriber identity (IMSI) format as subscriber identity information and using the authentication and key agreement protocol for authentication purposes.

It is thereby advantageously possible that not only network identifier information is able to be translated but also subscriber identifier information.

According to the present invention, it is advantageously furthermore possible and preferred that for such signalling messages and/or data traffic packets in the direction from the second mobile communication network towards the first mobile communication network:
- the private identifier information used within or by the second mobile communication network is replaced or translated by the specific PLMN identifier information related to the second mobile communication network and/or
- the private or non-public types of subscriber identity information and/or private or non-public types of subscriber credential information, used within or by the second mobile communication network relating to the user equipment, is/are replaced or translated by the subscriber identity information and/or subscriber credential information related to the second mobile communication network matching the type of subscriber identity and/or subscriber credential information used within the first mobile communication network, and/or wherein for such signalling messages and/or data traffic packets in the direction from the first mobile communication network towards the second mobile communication network
- the specific PLMN identifier information related to the second mobile communication network is replaced or translated by the private identifier information used within or by the second mobile communication network and/or
- the subscriber identity information and/or subscriber credential information related to the second mobile communication network matching the type of subscriber identity and/or subscriber credential information used within the first mobile communication network is/are replaced or translated by the private or non-public types of subscriber identity information and/or non-public types of subscriber credential information, used within or by the second mobile communication network relating to the user equipment.

It is thereby advantageously possible according to the present invention to apply the numbering translation both in the direction from a public network to a private (or non-public) network as well as in the direction form a private (or non-public) network to a public network.

According to the present invention, it is advantageously possible and preferred that the second mobile communication network is a standalone non-public network (SNPN) and/or wherein the specific PLMN identifier information related to the second mobile communication network is a globally unique PLMN identifier information or a regionally unique PLMN identifier information, especially a public PLMN identifier information. In the context of the present invention, i.e. regarding all embodiments of the present invention, the second mobile communication network is a non-public network (NPN) or a standalone non-public network (SNPN) having or using a private identifier information for identifying the network with a format different to that used by the first network (i.e. different from public identifier information used in the first network), and/or using a subscriber identifier format different to that used by the first network and/or using a subscriber authentication method different to that used by the first network.

According to the present invention, it is advantageously possible and preferred that the private identifier information of the second mobile communication network corresponds to at least one out of the following:
- a non-unique PLMN code having a non-unique mobile country code information,
- a non-unique PLMN code having a non-unique mobile country code and a non-unique network code information,
- a non-unique PLMN code together with a network identifier,
- a non-unique PLMN code together with a block of IMSI numbers,
- an identifier having a predetermined structure, especially not conforming with the structure of a PLMN identifier information.

Furthermore, it is advantageously possible and preferred according to the present invention that within or via the network identifier and number translating functionality:
- the private identifier information used within or by the second mobile communication network is associated or assigned to the specific PLMN identifier information related to the second mobile communication network and/or
- the private or non-public types of subscriber identity information and/or private or non-public types of subscriber credential information relating to the user equipment and used within or by the second mobile communication network is associated or assigned to subscriber identity information and/or subscriber credential information used within the second mobile communication network matching the type of subscriber identity and/or subscriber credential information used within the first mobile communication network.

According to a further preferred embodiment of the present invention, the publicity of the private identifier information relating to the second mobile communication network and/or the publicity of the private or non-public types of subscriber identity information and/or private or non-public types of subscriber credential information and/or subscriber identifier information relating to the second mobile communication network is masked or hidden via the first and second step.

Furthermore, the present invention relates to a system for an improved interconnection functionality between a first mobile communication network on the one hand, and a second mobile communication network on the other hand, the first mobile communication network corresponding either to a public land mobile network or to a mobile communication network domain, wherein the second mobile communication network is a non-public network (NPN) or a standalone non-public network (SNPN) having or using a private identifier information and wherein the first mobile communication network has been assigned to or has or uses a globally unique PLMN identifier information, wherein the first mobile communication network comprises a network identifier and number translating functionality, wherein the system is configured such that:
- the private identifier information used within or by the second mobile communication network and/or by a user equipment of the second mobile communication network is associated or assigned to a specific PLMN identifier information related to the second mobile communication network,
- in respect of signalling messages and/or data traffic packets that are to be routed or to be addressed or to be processed, the network identifier and number translating functionality provides for or supports a replacement and/or a translation, in both directions, between, on the one hand, the private identifier information related to the second mobile communication network, and, on the other hand, the specific PLMN identifier information related to the second mobile communication network.

Furthermore, the present invention relates to a mobile communication network being a first mobile communication network for an improved interconnection functionality between a first mobile communication network on the one hand, and the second mobile communication network on the other hand, the first mobile communication network corresponding either to a public land mobile network or to a mobile communication network domain, wherein the second mobile communication network is a non-public network (NPN) or a standalone non-public network (SNPN) having or using a private identifier information and wherein the first mobile communication network has been assigned to or has or uses a globally unique PLMN identifier information, wherein the first mobile communication network comprises a network identifier and number translating functionality, wherein the first mobile communication network is configured such that:
- the private identifier information used within or by the second mobile communication network and/or by a user equipment of the second mobile communication network is associated or assigned to a specific PLMN identifier information related to the second mobile communication network,
- in respect of signalling messages and/or data traffic packets that are to be routed or to be addressed or to be processed, the network identifier and number translating functionality provides for or supports a replacement and/or a translation, in both directions, between, on the one hand, the private identifier information related to the second mobile communication network, and, on the other hand, the specific PLMN identifier information related to the second mobile communication network.

Furthermore, the present invention relates to a network identifier and number translating functionality for an improved interconnection functionality between a first mobile communication network on the one hand, and a second mobile communication network on the other hand, the first mobile communication network corresponding either to a public land mobile network or to a mobile communication network domain, wherein the second mobile communication network is a non-public network (NPN) or a standalone non-public network (SNPN) having or using a private identifier information and wherein the first mobile communication network has been assigned to or has or uses a globally unique PLMN identifier information, wherein the first mobile communication network comprises a network identifier and number translating functionality, wherein the network identifier and number translating functionality is configured such that:
- the private identifier information used within or by the second mobile communication network and/or by a user equipment of the second mobile communication network is associated or assigned to a specific PLMN identifier information related to the second mobile communication network,
- in respect of signalling messages and/or data traffic packets that are to be routed or to be addressed or to be processed, the network identifier and number translating functionality provides for or supports a replacement and/or a translation, in both directions, between, on the one hand, the private identifier information related to the second mobile communication network, and, on the other hand, the specific PLMN identifier information related to the second mobile communication network.

Still additionally, the present invention relates to a program comprising a computer readable program code which, when executed on a computer and/or on a network node of a first mobile communication network and/or on a network identifier and number translating functionality, or in part on a network node of a first mobile communication network and in part on a network identifier and number translating functionality, causes the computer and/or the network node of the first mobile communication network and/or the network identifier and number translating functionality to perform an exemplary embodiment of the inventive method.

Furthermore, the present invention relates to a computer program product for an improved interconnection functionality between a second mobile communication network on the one hand, and a first mobile communication network on the other hand, the computer program product comprising a computer program stored on a storage medium, the computer program comprising program code which, when executed on a computer and/or on a network node of a first mobile communication network and/or on a network identifier and number translating functionality, or in part on a network node of a first mobile communication network and in part on a network identifier and number translating functionality, causes the computer and/or the network node of the first mobile communication network and/or the network identifier and number translating functionality to perform an exemplary embodiment of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a first mobile communication network 100 and a second mobile communication network 200 with an network exchange function 500 are schematically shown. The first mobile communication network 100 is implemented comprising a first radio access network 110 and a first core network 120, the first radio access network 110 exemplarily comprising a first base station entity 111 serving a first radio cell 10 or a corresponding radio coverage area. Likewise, the second mobile communication network 200 is implemented comprising a second radio access network 210 and a second core network 230, the second radio access network 210 exemplarily comprising a second base station entity 211 serving a second radio cell 10' or a corresponding radio coverage area. Typically such cellular mobile communication networks 100, 200 comprise a multitude of different base station entities and a corresponding plurality of radio cells. The first and second mobile communication networks 100, 200 are typically used to provide communication services to a number of user equipments connected or attached or registered to these mobile communication networks. In FIG. 1, only a first user equipment 20 and a second user equipment 220 are schematically shown, the first user equipment 20 having the first mobile communication network 100 as its home network (or home public land mobile network), and the second user equipment 220 having the second mobile communication network 200 as its home network (or home public land mobile network). The situation shown in FIG. 1 corresponds to a roaming situation for both the first and the second user equipments 20, 220: The first user equipment 20 is roaming to (or in) the second mobile communication network 200, and the second user equipment 220 is roaming to (or in) the first mobile communication network 100.

Both the first and the second mobile communication networks 100, 200 are typically 5G-networks (or a higher generation (than 5G) mobile communication networks). However, the first mobile communication network 100 typically corresponds to a public land mobile network (or to a mobile communication network domain)—in any case having been assigned or using a globally unique PLMN identifier information—, whereas the second mobile communication network 200 is a non-public network (NPN) or a standalone non-public network (SNPN) having or using a private identifier information.

According to the present invention, the first mobile communication network 100 comprises or has or is assigned to or is able to access a network identifier and number translating functionality 150 (in FIG. 1 exemplarily shown as being part of the core network 120 of the first mobile communication network 100).

According to the present invention, the private identifier information used within or by the second mobile communication network 200 and/or by a user equipment 220 of the second mobile communication network 200 is associated or assigned to a specific PLMN identifier information related to the second mobile communication network 200, this specific PLMN identifier information serving as a kind of alias information in order to identify the second mobile communication network 200 (outside thereof). Furthermore according to the present invention, in respect of signalling messages and/or data traffic packets that are to be routed or to be addressed or to be processed, the network identifier and number translating functionality 150 provides for or supports a replacement and/or a translation, in both directions, between, on the one hand, the private identifier information related to the second mobile communication network 200, and, on the other hand, the specific PLMN identifier information related to the second mobile communication network 200. Thereby it is advantageously possible according to the present invention that the second mobile communication network 200 is able to be interconnected with other mobile communication networks—especially public networks, such as public land mobile networks—and especially to be able to be identified via unique or standardized identifier information while still using its private identifier information (for its own purposes).

Figure 2:
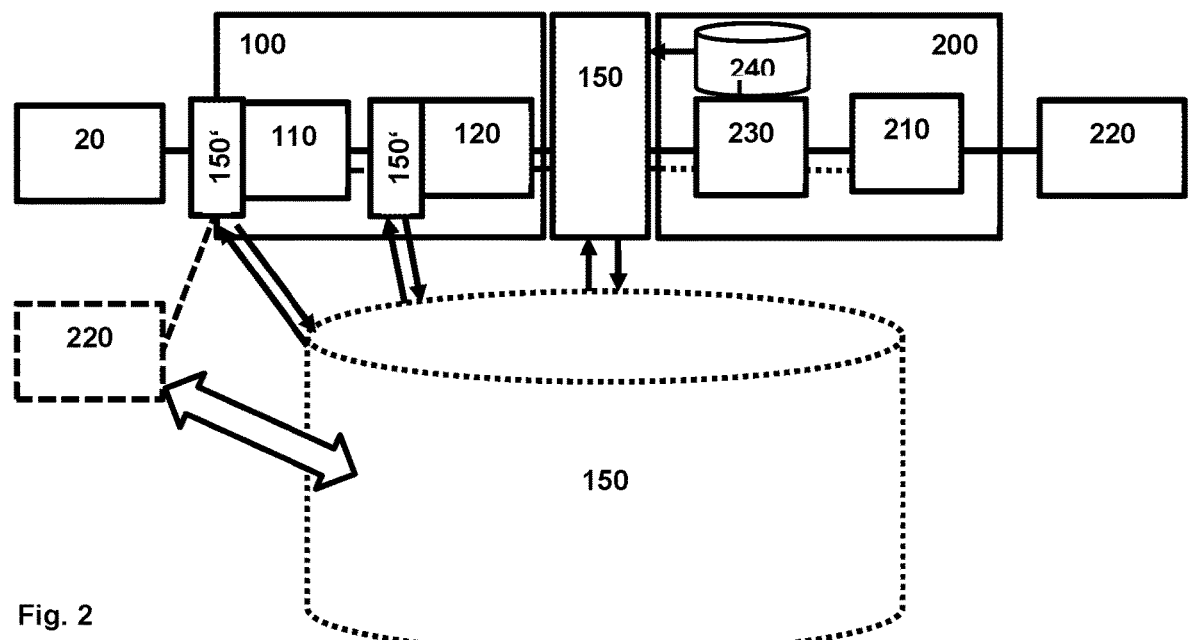

In FIG. 2, the first and second mobile communication networks 100, 200 are once more schematically represented together with the network identifier and number translating functionality 150 according to the present invention. The first mobile communication network 100 comprising its radio access network 110, and its core network 120, and the second mobile communication network 200 also comprising its radio access network 210, and its core network 230; in addition, a unified data management unified data repository functionality or entity 240 is schematically shown in FIG. 2. The first mobile communication network 100 is a public network (hereinafter also called "Public Network A"), having a globally unique PLMN identifier information, e.g. of the following kind: MCC_A/MNC_A. The second mobile communication network 200 is a non-public network, NPN, or a standalone non-public network, SNPN (hereinafter also called "SNPN network B"), having or using a private identifier information, e.g. of the following kind: SNPN Network B 999/MNC_B/NID_B. If the second user equipment 220, having as its home network the second mobile communication network 200, is located within the radio coverage area of the second mobile communication network 200, then the private identifier information of the second mobile communication network 200 is able to be used without problems between this second user equipment 220 and its home network, SNPN network B; this situation is schematically represented, in FIG. 2, via the second user equipment 220 being shown on the right hand side of the second mobile communication network 200. However, in case that the second user equipment 220 is roaming outside of the second mobile communication network 200 (e.g. to the radio coverage area of the first mobile communication network 100; this situation is schematically represented—using a dashed line for the second user equipment 220—, in FIG. 2, via the second user equipment 220 being shown on the left hand side of the first mobile communication network 100) the exclusive use of the private identifier information of the second mobile communication network 200 (by the second user equipment 220 and/or by the second mobile communication network 200 itself) might lead to difficulties due to the second mobile communication network's 200 identifier information being a private (and, hence, not public and/or not unique and/or not globally unique) identifier information. According to the present invention, the network identifier and number translating functionality 150 provide a translation regarding the identity information used for the second mobile communication network 200 especially in such a case of a roaming situation of the second user equipment 220: If the second user equipment 220 (also called "UE_B" SNPN) is located (and/or attached and or registered) with the first mobile communication network 100, an replacement operation is performed regarding the identifier information of the second mobile communication network 200, e.g. of the following kind: 999/MNC_B/NID_B→PLMN A (MCC_AB/MNC_AB) and SNPN Private IDs (+Sec)→IMSI+AKA. This means that regarding the network identifier information (or network identity of the first mobile communication network 100) the private identifier information ("999/MNC_B/NID_B") is replaced and/or translated into the specific PLMN identifier information ("PLMN A (MCC_AB/MNC_AB)") that is used or is usable also within the second mobile communication network 200 (i.e. outside of the first mobile communication network 100), and regarding the subscriber credential information (or subscriber credentials, hereinafter also called subscriber identity information and/or subscriber credential information relating to the (second) user equipment 220), the private or non-public types of subscriber identity information and/or private or non-public types of subscriber credential information ("SNPN Private IDs (+Sec)") is replaced and/or translated into subscriber identity information and/or subscriber credential information matching the type of subscriber identity and/or subscriber credential information used within the first mobile communication network 100 ("IMSI+AKA"), i.e. especially the international mobile subscriber identity (IMSI) format is used as subscriber identity information and the authentication and key agreement protocol is used for authentication purposes. According to the present invention, this translation operation is performed by the network identifier and number translating functionality 150, being defined as a service or function for network identifier information and numbering translation (hereinafter also called SNAN) which maps network identities (or network identifier information) and subscriber numbers together with credentials between the non-public network domain (of the second mobile communication network 200) and the public domain (i.e. the first mobile communication network 100). Especially, the network identifier and number translating functionality (or SNAN) function/service is able to be plugged-in (cf. plug-in units 150' in FIG. 2) to entities handling access stratum (AS) and non-access stratum (NAS) signalling (i.e. signalling messages and/or data traffic packets that are to be routed or to be addressed or to be processed) and perform the numbering translation to a new set of assigned public IDs (i.e.—regarding the network identification information used—the specific PLMN identifier information related to the second mobile communication network 200, and—regarding the subscriber identity information and/or subscriber credential information relating to the (second) user equipment 220—subscriber identity information and/or subscriber credential information matching the type of subscriber identity and/or subscriber credential information used within the first mobile communication network 100). As a result, the private used SNPN IDs of the user equipment 220 are translated on signalling behalf to new dedicated public IDs (dedicated to this SNPN/NID) which are useable and known in the Public PLMN (i.e. the first mobile communication network 100 as target network).

Additionally, the SNAN (or network identifier and number translating functionality 150) translate back to the private IDs used and known in SNPN (Source Network). Besides AS and NAS signalling also if required GTP protocol IDS can be translated for data traffic.

It is conventionally known how to provide or enable roaming between different mobile communication networks, such as the first and second mobile communication network 100, 200. In order to provide a user equipment in a 5G System connectivity to a Data Network (e.g. the Internet), the user equipment is connected to an access network (e.g. gNBs, WiFi access) and a core network provides connectivity towards the data network. The user equipment possesses a subscription to the network it is attached which the core network evaluates so as to among other things confirm that the user equipment has indeed the right to access the requested resources. In a roaming case, a user equipment with a subscription to, e.g., a first network is attached to a second network as a visited network, which has a roaming agreement with the first network to either forward Control Plane (CP) and User Plane (UP) traffic towards the first network (home routed case) or to locally route the user plane traffic (local breakout case). In the context of 5G, the local breakout and home-routed cases differ in the amount of inter-network interface required for performing CP/UP communication between the home and visited networks; 3GPP document TS 23.501 defines the interfaces between the visited and home 5G network cores in the roaming case. It is known to the visited network that a given user equipment is a subscriber of another network. In order for a 5G core network function to be able to communicate with network functions of another network (e.g. of another PLMN, identified by a PLMN ID different than that of the own network), the network function(s) in the visited network either have local configuration pointing to network functions in each specific home network with which a roaming agreement exists or the Network Repository Function (NRF) is used to discover such network functions of the home network.

In order to identify public networks (PLMNs), PLMNs codes are used. A PLMN is identified by a globally unique PLMN code which includes a MCC (Mobile Country Code) and MNC (Mobile Network Code). Hence, it is a five- to six-digit number identifying a country, and a mobile network operator in that country, usually represented in the form 001-01.

The ITU-T Recommendation E.212 defines mobile country codes (MCC) as well as mobile network codes (MNC). Most of the MCCs are managed by national regulatory authorities, with the exception of the ones starting with 9, which are for worldwide use and assigned by ITU itself (e.g. satellite, ships, etc.). A special case is that of the 999, i.e. MCC=999, which can be used without the need of registering with ITU.

In order to identify a subscriber in a mobile network, an international mobile subscriber identity (IMSI) is a number that uniquely identifies every user of a cellular network. The IMSI is used in any public mobile network that interconnects with other networks.

The IMSI conforms to the ITU E.212 numbering standard. The IMSI contains the MCC (3 digits), MNC (2 or 3 digits), as well as a Mobile Subscriber Identity (MSIN), wherein the IMSI comprises in total up to 15 digits.

In contrast to identifiers used in public land mobile networks, conforming to the a.m. standards, private identifier information identifying non-public networks could provide a solution to identify private networks via a common PLMN and IMSI blocks. In this case, the IMSI structure would be as follows: there would be an MCC (3 digits, e.g. "999"), then followed by an MNC (2 or 3 digits, e.g. "99"), then followed by an IMSI block of, e.g., 4 digits (such as "1234"), and finally followed by an MSIN, identifying the subscriber or user equipment, e.g. "123456" (wherein again a maximum of 15 digits could apply). In such cases, a single PLMN code per country could be used for private networks, with several IMSI blocks being distributed to individual networks.

Whenever roaming is realized, PLMNs typically use interconnection services, such as IPX service providers, which simplify the task of establishing connectivity towards every individual roaming partner and provide routing of signaling messages between networks. An extensive infrastructure supporting PLMN-based roaming and interconnection services exists, and allows networks to communicate with each other, often also via a plurality of such IPX services. In order for the currently implemented infrastructure is able to route signaling messages, the basic premise that needs to be fulfilled is that mobile communication networks are able to be individually identified by a PLMN code and that PLMN code can be unequivocally mapped to a mobile communication network.

In order to provide the possibility to both
use private identifier information to identify mobile communication networks and/or their subscribers (within, e.g., a non-public network (or standalone non-public network) and with respect to its subscribers)
and nevertheless be able—also for those subscribers of such non-public or standalone non-public networks— to provide the possibility for roaming and for interconnection with other mobile communication networks that use the internationally standardized convention regarding PLMN IDs and/or IMSI numbers
according to the present invention, it is provided the new SNAN service (or function), or network identifier and number translating functionality, which maps network identities and subscriber numbers together with credentials between the non-public network domain and the PLMN domain. Regarding the PLMN domain, the network identity is typically defined via a valid PLMN identifier or PLMN identifier information (e.g. "262 01"). Regarding the subscriber credentials, such a PLMN domain makes use of the IMSI as well as authentication and key agreement procedures/identifiers. Regarding the non-public network domain, different possibilities exist or could be implemented regarding a definition of the network identity: Either a non-unique PLMN code (e.g. "999-99"), or a non-unique PLMN code together with a network identifier (NID, network ID) (e.g. "999-99", "123" as NID), or a non-unique PLMN code and an IMSI block. Regarding the subscriber credentials, such a non-public network domain could make use of a SNPN private identity information and security mechanism such as NAI (Network Access Identifier), EAP (Extensible Authentication Protocol) and/or authentication protocols not supported by public networks (e.g. SNPN-specific methods not standardized by 3GPP).

Figure 3:
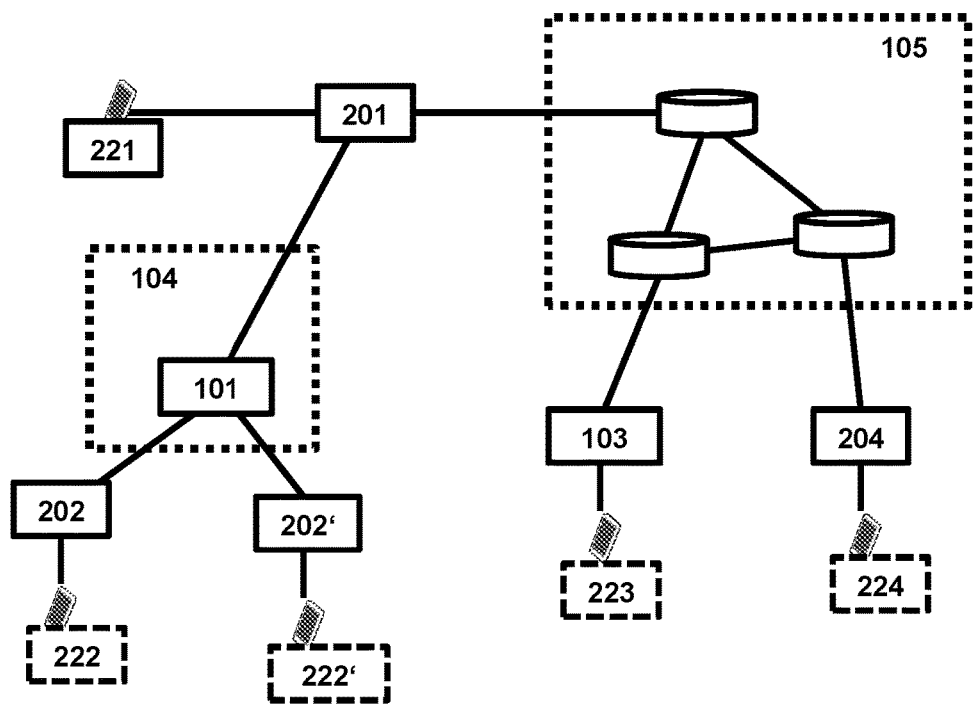
FIGS. 3 and 4 schematically illustrate examples of different network configurations according to the present invention.
Figure 4:
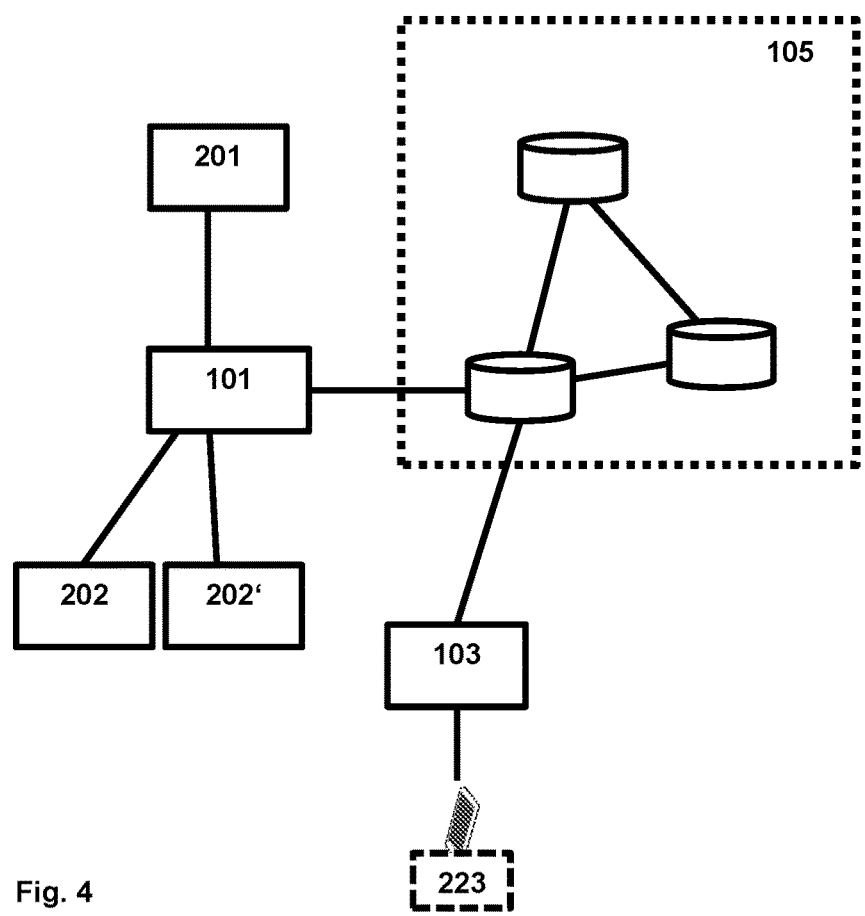

In FIGS. 3 and 4, examples of different interconnection situations between PLMN network domains and non-public network domains are exemplarily and schematically shown. All these scenarios are supported by exemplary embodiments of the inventive method, especially via the SNAN (or network identifier and number translating functionality 150). Regarding FIG. 3, network 201 is assumed to be a mobile communication network of the type of the second mobile communication network 200, i.e. a non-public network, NPN (or a standalone non-public network, SNPN), having or using a private identifier information. If a user equipment, indicated via reference sign 221, has network 201 as its home network and is connected directly to its home network, no roaming and no interworking needs to be realized or provided for; both user equipment and network normally use their respective network identity and user equipment identifier.

In case that the same (i.e. having network 201 as its home network) user equipment, indicated via reference sign 222, is connected to another network 202, also of the type of the second mobile communication network 200, i.e. a non-public network (NPN) (or a standalone non-public network (SNPN)), having or using a private identifier information (but network 202 differs from network 201, of course), the user equipment 222 needs to be connected to its home network 201 via network 202. In the exemplary situation represented in FIG. 3, networks 201 and 202 are part of a virtual PLMN domain 104; in this virtual PLMN domain 104, PLMN codes used in this domain are valid within this domain and managed by network 101 (which is a public land mobile network, i.e. it is assumed to be a mobile communication network of the type of the first mobile communication network 100); within this network 101 (or within this virtual PLMN domain 104), virtual PLMN codes are used, i.e. when user equipment 222 is connecting to network 201 via network 202, requests between these networks use virtual PLMN codes mapped by the SNAN (or network identifier and number translating functionality 150) univocally identifying each network. The same consideration applies with respect to user equipment 222', connected via network 202' to network 201, network 202' also being a mobile communication network of the type of the second mobile communication network 200, i.e. a non-public network (NPN) (or a standalone non-public network (SNPN)), having or using a private identifier information.

In case that the same (i.e. having network 201 as its home network) user equipment, indicated via reference sign 223, is connected to another network 103 (which is a public land mobile network, i.e. it is assumed to be a mobile communication network of the type of the first mobile communication network 100), the interconnection is realized by global PLMN domain 105, so the roaming or interconnection can be processed and routed via existing infrastructure, the network identifier and subscriber identities are, likewise, mapped by the SNAN (or network identifier and number translating functionality 150).

Likewise, in case that the same (i.e. having network 201 as its home network) user equipment, indicated via reference sign 224, is connected to another network 204 (which is also of the type of the second mobile communication network 200, i.e. a non-public network (NPN) (or a standalone non-public network (SNPN)), having or using a private identifier information, but again network 204 being different from network 201, of course), the interconnection is likewise realized by global PLMN domain 105, so the roaming or interconnection can be processed and routed via existing infrastructure, the network identifier and subscriber identities are, likewise, mapped by the SNAN (or network identifier and number translating functionality 150).

Regarding FIG. 4, networks 201, 202, and 202' are all is assumed to be (different) mobile communication networks of the type of the second mobile communication network 200, i.e. a non-public network (NPN) (or a standalone non-public network (SNPN)), having or using a private identifier information. In case that the same (i.e. having network 201 as its home network) user equipment, indicated via reference sign 223, is connected to another network 103

(which is a public land mobile network, i.e. it is assumed to be a mobile communication network of the type of the first mobile communication network 100), the interconnection is realized by global PLMN domain 105, so the roaming or interconnection can be processed and routed via existing infrastructure. FIG. 4 shows the case in which several such NPNs or SNPNs (i.e. networks 201, 202, and 202') are provided with a mapped, globally valid identifier by a PLMN provider (network 101), which then can internally distribute and map a part of (e.g. via IMSI blocks) via the SNAN (or network identifier and number translating functionality 150).

According to the present invention, the method handles different layers and directions:
1) Signaling messages interconnect networks based on non-unique PLMN with public PLMN-based networks in following routing directions:
   SNPN→SNPN
   SNPN→PLMN
2) User Plane GTP (GPRS tunneling protocol) data routing of networks based on non-unique PLMN to public PLMN-based networks are enabled in the following directions:
   SNPN→SNPN
   SNPN→PLMN
The method comprises the following elements:
   a function to correlate and assign addresses by public numbering ranges of a dedicated public PLMN to subscribers of one or more SNPNs (this could be IPX centralized);
   a service or a function to assign to private NPN subscribers a fixed or temporary public ID;
   a signaling service/function to replace the private SNPN PLMN+NID with an uniquely assigned public PLMN ID (this could also be IPX centralized)
   a user-plane service or function to replace for GTP the private SNPN PLMN+NID with an uniquely assigned public PLMN ID (this could also be IPX centralized)
   an authentication support function for roaming private NPN subscribers;
   an assignment of ID tokens which are unique for subscribers using the translation services and a valid correlation ID for a specific SNPN.

In the following, a handover procedure is used to explain the principle of the SNAN function or service according to the present invention, namely a handover such that the source network would be the SNPN RAN/AMF, i.e. the second mobile communication network 200, and the target RAN/AMF would be the public PLMN, i.e. the first mobile communication network 100:
If a user equipment, e.g. the second user equipment 220, moves from SNPN (i.e. the second mobile communication network 200) to a Pubic Network (i.e. the first mobile communication network 100), the target radio access network 110 (NG-RAN, next generation radio access network) of the public PLMN sends a access stratum Path Switch Request message to the access and mobility management function of the SNPN (i.e. the second mobile communication network 200) to inform that the second user equipment 220 has moved to a new target cell and provides a list of PDU sessions to be switched. This initiates a mobility registration update procedure upon changing to the new target tracking area (TA) outside of the (private) registration area of the second user equipment 220.
Such a handover procedure would not work in case the second user equipment 220 uses or sends private SNPN IDs (i.e. private identifier information). The SNAN function/service (or network identifier and number translating functionality 150) is able to be plugged-in to entities handling AS (access stratum) and NAS (non-access stratum) signalling and perform the numbering translation to a new set of assigned public IDs. As a result the privately used SNPN IDs of the second user equipment 220 are translated on signalling behalf to new dedicated Public IDs (dedicated to this SNPN/NID) which are useable and known in the Public PLMN (i.e. the target Network). Accordingly, the SNAN also does this translation in opposite direction, i.e. to the private IDs used and known in SNPN (i.e. the source network). Besides AS and NAS signalling, also GTP protocol IDS can be translated for data traffic if required.

Figure 5:
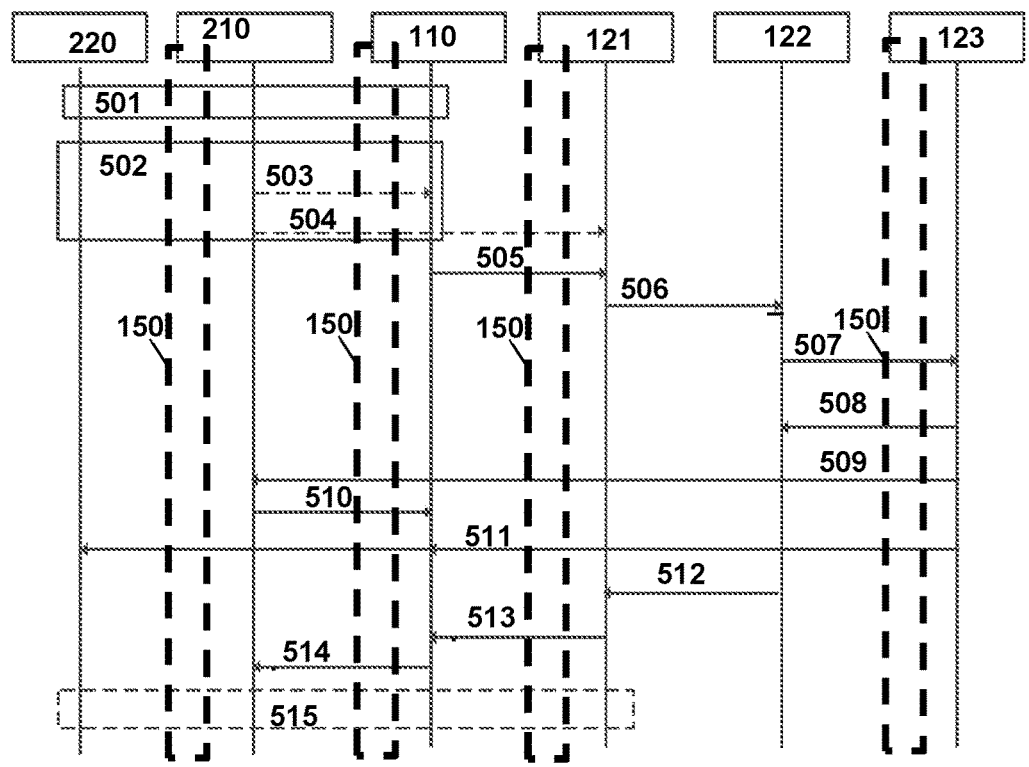
FIG. 5 schematically illustrates an example of a communication between a first and a second mobile communication network in case of a handover procedure related to a user equipment.

This is further explained in FIG. 5 which schematically shows an example of a communication between a first and a second mobile communication network 100, 200 in case of a handover procedure related to a (second) user equipment 220. Especially, the communication between the second user equipment 220, the source next generation radio access network, i.e. the access network 210 of the second mobile communication network 200, the target next generation radio access network, i.e. the access network 110 of the first mobile communication network 100, an access and mobility management function 121 (of the target network, i.e. of the first mobile communication network 100), a session management function 122 (likewise of the target network, i.e. of the first mobile communication network 100), and a user plane function 123 (likewise of the target network, i.e. of the first mobile communication network 100). In a first processing step 501, handover preparation is performed. In a second processing step 502, handover execution is performed. In a third processing step 503, the access network 210 of the second mobile communication network 200 forwards data to the access network 110 of the first mobile communication network 100. In a fourth processing step 504, the access network 210 of the second mobile communication network 200 sends RAN Usage data report to the access network 110 of the first mobile communication network 100. In a fifth processing step 505, the access network 110 of the first mobile communication network 100 transmits a access stratum Path Switch Request to the access and mobility management function 121. In a sixth processing step 506, the access and mobility management function 121 transmits a Nsmf_PDU Session_UpdateSMContext Request to the session management function 122. In a seventh processing step 507, the session management function 122 transmits a N4 Session Modification Request to the user plane function 123. In an eighth processing step 508, the user plane function 123 sends a N4 Session Modification Response to the session management function 122. In a ninth processing step 509, the user plane function 123 transmits a data session identifier to the access network 210. In a tenth processing step 510, the access network 210 transmits a data session identifier to the access network 110. In an eleventh processing step 511, the user plane function 123 and/or the access network 110 transmit(s) downlink data to the user equipment 220. In a twelfth processing step 512, the session management function 122 transmits a Nsmf_PDU Session_UpdateSMContext Response to the access and mobility management function 121. In a thirteenth processing step 513, the access and mobility management function 121 transmits a access stratum Path Switch Request Acknowledge to the access network 110. In a fourteenth processing step 514, the access network 110 transmits a Release Resources message to the access network 210. In a fifteenth processing step 515, a Registration Procedure is performed. According to the present invention, a network identifier and number translating functionality 150 is plugged-in into (or put in front of)

the access network 210 of the second mobile communication network 200, the access network 110 of the first mobile communication network 100, the access and mobility management function 121, and the user plane function 123 in order to perform an exemplary embodiment of the inventive method. It is thereby advantageously possible according to the present invention that the SNAN service network elements (i.e. the network identifier and number translating functionality 150) in front of elements of a public land mobile network for different functions to replace private with public addresses. Hence, a new service or functionality between one or more SNPN networks is possible in order to replace their private numbering with a commonly used public numbering (or commonly used private numbering space). Advantageously, there is provided for (or the network identifier and number translating functionality 150 provides) a public address repository which assigns to each private SNPN a public number space. Such a repository is also able to be hosted by an IPX service. It is advantageously possible to provide for a binding between a specific SNPN NID (or a new signaling token) and the SNAN database assigned new public numbering (PLMN-ID . . . ).

The SNAN (or network identifier and number translating functionality 150) is able to be used for the following:

Allow messages containing SNPN network identifiers or addresses to be routed using existing PLMN-based methods;

Allow to assign for SNPNs public PLMN codes with which they have an agreement to route their signaling over existing public interconnect infrastructure;

Allow PLMNs to create regions where certain mapped PLMN codes are routable, i.e. virtual PLMN codes that are only valid within a public network;

Route data traffic of SNPNs towards its intended destination (GTP routing based in PLMN ID);

Mask the network and/or subscriber identifiers while in transit in the interconnection network.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for an interconnection functionality between a first mobile communication network and a second mobile communication network, wherein the first mobile communication network corresponds to a public land mobile network, wherein the second mobile communication network is a non-public network (NPN) or a standalone non-public network (SNPN) having or using private identifier information, wherein the first mobile communication network has been assigned to or has or uses globally unique public land mobile network (PLMN) identifier information, wherein the first mobile communication network comprises a network identifier and number translating functionality, wherein the method comprises:

in a first step, associating or assigning the private identifier information to specific PLMN identifier information related to the second mobile communication network, wherein the specific PLMN identifier information related to the second mobile communication network is globally unique PLMN identifier information or regionally unique PLMN identifier information; and in a second step, subsequent to the first step, and in respect of signalling messages and/or data traffic packets that are to be routed or to be addressed or to be processed, providing for or supporting, by the network identifier and number translating functionality, a replacement and/or a translation, in both directions, between the private identifier information and the specific PLMN identifier information related to the second mobile communication network;

wherein the private identifier information of the second mobile communication network corresponds to at least one out of the following:

a non-unique PLMN code having non-unique mobile country code information, a non-unique PLMN code having a non-unique mobile country code and non-unique network code information, a non-unique PLMN code together with a network identifier, or a non-unique PLMN code together with a block of international mobile subscriber identity (IMSI) numbers.

2. The method according to claim 1, wherein within the second mobile communication network, subscriber identity information and/or subscriber credential information relating to the user equipment is used corresponding to private or non-public types of subscriber identity information and/or private or non-public types of subscriber credential information;

wherein—in the first step—such private or non-public types of subscriber identity information and/or private or non-public types of subscriber credential information, used within or by the second mobile communication network relating to the user equipment, is associated or assigned to subscriber identity information and/or subscriber credential information matching the type of subscriber identity and/or subscriber credential information used within the first mobile communication network, corresponding to using the IMSI format as subscriber identity information and using the authentication and key agreement protocol for authentication purposes; and wherein, in respect of signalling messages and/or data traffic packets to be routed or to be addressed or to be processed, the network identifier and number translating functionality provides for or supports—in the second step—a replacement and/or a translation, in both directions, between, on the one hand, the private or non-public types of subscriber identity information and/or private or non-public types of subscriber credential information related to the second mobile communication network, and, on the other hand, the type of subscriber identity and/or subscriber credential information used within the first mobile communication network, corresponding to using the IMSI format as subscriber identity information and using the authentication and key agreement protocol for authentication purposes.

3. The method according to claim 1, wherein for the signalling messages and/or data traffic packets in the direction from the second mobile communication network towards the first mobile communication network:
   the private identifier information used within or by the second mobile communication network is replaced or translated by the specific PLMN identifier information related to the second mobile communication network; and/or
   the private or non-public types of subscriber identity information and/or private or non-public types of subscriber credential information, used within or by the second mobile communication network relating to the user equipment, is/are replaced or translated by the subscriber identity information and/or subscriber credential information related to the second mobile communication network matching the type of subscriber identity and/or subscriber credential information used within the first mobile communication network; and/or
   wherein for the signalling messages and/or data traffic packets in the direction from the first mobile communication network towards the second mobile communication network:
   the specific PLMN identifier information related to the second mobile communication network is replaced or translated by the private identifier information used within or by the second mobile communication network; and/or
   the subscriber identity information and/or subscriber credential information related to the second mobile communication network matching the type of subscriber identity and/or subscriber credential information used within the first mobile communication network is/are replaced or translated by the private or non-public types of subscriber identity information and/or private or non-public types of subscriber credential information, used within or by the second mobile communication network relating to the user equipment.

4. The method according to claim 1, wherein the second mobile communication network is a standalone non-public network (SNPN).

5. The method according to claim 1, wherein the private identifier information of the second mobile communication network further corresponds to:
   an identifier having a predetermined structure not conforming with the structure of PLMN identifier information.

6. The method according to claim 1, wherein within or via the network identifier and number translating functionality:
   the private identifier information used within or by the second mobile communication network is associated or assigned to the specific PLMN identifier information related to the second mobile communication network; and/or
   the private or non-public types of subscriber identity information and/or private or non-public types of subscriber credential information relating to the user equipment and used within or by the second mobile communication network is associated or assigned to subscriber identity information and/or subscriber credential information used within the second mobile communication network matching the type of subscriber identity and/or subscriber credential information used within the first mobile communication network.

7. The method according to claim 1, wherein the publicity of the private identifier information relating to the second mobile communication network and/or the publicity of the private or non-public types of subscriber identity information and/or private or non-public types of subscriber credential information and/or subscriber identifier information relating to the second mobile communication network is masked or hidden via the first and second steps.

8. The method according to claim 1, wherein the specific PLMN identifier information related to the second mobile communication network is a PLMN-compliant alias for the second mobile communication network.

9. The method according to claim 1, wherein the private identifier information is not PLMN-compliant, and the specific PLMN identifier information related to the second mobile communication network is PLMN-compliant.

10. A system for an interconnection functionality between a first mobile communication network and a second mobile communication network, the system comprising:
   the first mobile communication network, wherein the first mobile communication network corresponds to a public land mobile network; and
   the second mobile communication network, wherein the second mobile communication network is a non-public network (NPN) or a standalone non-public network (SNPN) having or using private identifier information;
   wherein the first mobile communication network has been assigned to or has or uses globally unique PLMN identifier information;
   wherein the first mobile communication network comprises a network identifier and number translating functionality,
   wherein the private identifier information is associated or assigned to specific PLMN identifier information related to the second mobile communication network, wherein the specific PLMN identifier information related to the second mobile communication network is globally unique PLMN identifier information or regionally unique PLMN identifier information;
   wherein, in respect of signalling messages and/or data traffic packets that are to be routed or to be addressed or to be processed, the network identifier and number translating functionality is configured to provide for or support a replacement and/or a translation, in both directions, between the private identifier information and the specific PLMN identifier information related to the second mobile communication network;
   wherein the private identifier information of the second mobile communication network corresponds to at least one out of the following:
   a non-unique PLMN code having non-unique mobile country code information, a non-unique PLMN code having a non-unique mobile country code and non-unique network code information, a non-unique PLMN code together with a network identifier, or a non-unique PLMN code together with a block of international mobile subscriber identity (IMSI) numbers.

11. A non-transitory computer-readable medium having processor-executable instructions stored thereon for an interconnection functionality between a first mobile communication network and a second mobile communication network, wherein the first mobile communication network corresponds to a public land mobile network, wherein the second mobile communication network is a non-public network (NPN) or a standalone non-public network (SNPN) having or using private identifier information, wherein the first mobile communication network has been assigned to or has or uses globally unique public land mobile network (PLMN) identifier information, wherein the first mobile communication network comprises a network identifier and number translating functionality, wherein the processor-executable instructions, when executed, facilitate:

associating or assigning the private identifier information to specific PLMN identifier information related to the second mobile communication network, wherein the specific PLMN identifier information related to the second mobile communication network is globally unique PLMN identifier information or regionally unique PLMN identifier information; and in respect of signalling messages and/or data traffic packets that are to be routed or to be addressed or to be processed, providing for or supporting, by the network identifier and number translating functionality, a replacement and/or a translation, in both directions, between the private identifier information and the specific PLMN identifier information related to the second mobile communication network;

wherein the private identifier information of the second mobile communication network corresponds to at least one out of the following:

a non-unique PLMN code having non-unique mobile country code information, a non-unique PLMN code having a non-unique mobile country code and non-unique network code information, a non-unique PLMN code together with a network identifier, or a non-unique PLMN code together with a block of international mobile subscriber identity (IMSI) numbers.

* * * * *